United States Patent
Chiang

(10) Patent No.: US 8,211,316 B2
(45) Date of Patent: Jul. 3, 2012

(54) DEVICE FOR DEEP SEWAGE TREATMENT WITHOUT SLUDGE DISCHARGE

(76) Inventor: Ming-hui Chiang, Babqiao (TW)

(*) Notice: Subject to any disclaimer, the term of this patent is extended or adjusted under 35 U.S.C. 154(b) by 375 days.

(21) Appl. No.: 12/425,383

(22) Filed: Apr. 17, 2009

(65) Prior Publication Data
US 2009/0272687 A1 Nov. 5, 2009

Related U.S. Application Data

(63) Continuation of application No. PCT/CN2007/002943, filed on Oct. 12, 2007, now abandoned.

(30) Foreign Application Priority Data

Oct. 30, 2006 (CN) .......................... 2006 1 0117730

(51) Int. Cl.
C02F 1/00 (2006.01)
(52) U.S. Cl. .................... 210/743; 210/767; 210/800
(58) Field of Classification Search .................. 210/605, 210/620, 743, 767, 800, 616, 623, 626, 631
See application file for complete search history.

(56) References Cited

U.S. PATENT DOCUMENTS

| | | | | |
|---|---|---|---|---|
| 5,013,442 A | * | 5/1991 | Davis et al. | 210/614 |
| 5,141,646 A | * | 8/1992 | Rozich | 210/613 |
| 5,811,009 A | * | 9/1998 | Kos | 210/605 |

FOREIGN PATENT DOCUMENTS

WO    WO 2008052413 A1 *    5/2008

* cited by examiner

*Primary Examiner* — Chester Barry
(74) *Attorney, Agent, or Firm* — Hiroe & Associates; Dwayne L Bentley

(57) ABSTRACT

A deeply sewage treating method and apparatus without sludge discharging is disclosed by means of the physical, chemical and biological methods. Proper sewage treating agent with powerful adsorbing capacity, organic matter decomposing and oxidizing capacity and settling capacity is selected based on the quantity of sewage and pollutant characteristic of the sewage to be treated. Sewage is treated through an integrative function tank that comprises a grille primary tank (1), a settling tank (2), high concentration aeration tank (3), aerobic biological tank (4), anaerobic sludge returning tank (5), a sludge and cleaning water separating tank (6), separating tank (7), and pouring tank (8). Sewage is subjected to physical filtering, chemical regulation of pH value, aerating, biological treatment, settling and filtering, so that organic pollutant is converted into microbe that is oxidized and decomposed into $CO_2$, $H_2O$, $NH_3$ and small amount of excess sludge for inside circulating treatment. The treated water reaches the draining standard.

3 Claims, 2 Drawing Sheets

DEVICE FOR DEEP SEWAGE TREATMENT WITHOUT SLUDGE DISCHARGE

RELATED APPLICATIONS

This application is a continuation of International Application PCT/CN2007/002943, with an international filing date of Oct. 12, 2007, now abandoned, which claims priority to Chinese Application CN 200610117730.5, having a filing date of Oct. 30, 2006, now pending, all of which are hereby incorporated herein by reference.

FIELD OF THE INVENTION

The present invention relates to a technical field of environmental protection, particularly to a method of deep sewage treatment without sludge discharge by comprehensively adopting physical, chemical and biological sewage treatment technology and device thereof.

BACKGROUND OF THE INVENTION

Currently, because the industrial waste water generated in some professional domains has many shortcomings such as large amount of discharge and high density of pollutant, which is causing more and more serious pollution to the water environment and destroying the ecological equilibrium of all the world, it both seriously effects human living environment and hinders the development of these professional domains. Because the problem of sewage treatment and the ecological environmental protection is considered more and more important in various professional domains, massive persons and money have been used in the topic research, and many research results have been achieved. The pollutant in waste water mainly includes: biologically decomposable organic matter, volatile organic matter, uneasily decomposing organic matter, toxic metal, suspended solid matter, nutrient salt (nitrogen and phosphorus), pathogenesis microorganism and parasitic zoology and botany or the like. The standard of the industrial water pollutant discharge according to the current national provisions is to mainly define biochemical oxygen demand (BOD5), chemical oxygen demand (COD), chromaticity, PH value, suspension, ammonia and nitrogen, sulfide, hexavalent chromium, copper, phenyl amines, chlorine dioxide or the like. So it is the main object of sewage treatment to degenerate, reduce and control the density and amount of the above ones to achieve and even lower than the standard of the pollutant discharge according to the national provisions.

Currently, general treatment methods in industrial waste water and living sewage include physical treatment methods, chemical treatment methods and biological treatment methods. In physical treatment methods, organic impurities such as suspension, floating matter and fine fiber are removed by bar screen and strainer, adjustment, precipitation, gas floating and filter membrane. In chemical treatment methods, by placing various medicaments in the neutralization tank or the response pond, in the way of neutralization, coagulation, electrolysis, oxidation, adsorption, disinfection or the like, PH value, color waste matter, colloid suspension, BOD biochemical oxygen demand, COD chemical oxygen demand, LAS linear chain alkyl benzene sulfonate, tiny suspension, macromolecule organic matter and bacterium are processed. Biological treatment methods mainly include anaerobic biological process and aerobic biological process, wherein: in anaerobic biological process BOD, COD, color waste matter, $NH_3$—N and phosphorus are mainly processed by upstream anaerobic sludge bed, anaerobic attached film expanded bed, anaerobic fluidized bed and hydrolysis acidification or the like; in aerobic biological process BOD, COD, color waste matter, $NH_3$—N and phosphorus are mainly processed by recycled activated sludge treatment, adsorption regeneration oxidation method and biological contact oxidation method.

Generally, conventional sewage treatment devices or systems adopt a sole one of physical treatment methods, chemical treatment methods and biological treatment methods. Though they have effect on improving some standards of water quality, in fact they have limitation and total processing results are not desirable. Moreover the expense of the infrastructure and device of these processing methods in earlier period is expensive, and the cost of operation is very high because a large quantity of medicaments and chemical additives are frequently placed in operation. In addition, during all the period of processing the sewage other pollutant, particularly massive sludge is generated and discharged. While some sewage treatment devices have functions of concentrating, drying and grinding sludge, at last the pollutant must be discharged to the outside, which will be a new pollution source regardless of falling to rubbish site or burying deeply in the earth. Therefore, current sewage treatment methods can not indeed realize the object of environmental protection.

SUMMARY OF THE INVENTION

In view of the above, the present invention provides a new method of deep sewage treatment without sludge discharge and device thereof. Its advantage is in that the expense of device is low, the cost of operation is low, the effect of processing sewage is good, the standard of discharge is achieved or even lower than, it is able to be recycled, and there is no pollutant discharge during all the period and no secondary pollutant.

In accordance with an aspect of the invention, there is provided a new method of deep sewage treatment without sludge discharge: comprehensively adopting physical, chemical and biological sewage treatment technology; selecting the suitable sewage treatment agent of LTC-A developed by Shanghai LianTan Chemical Ltd according to the amount of sewage and the intrinsic characteristics of sewage pollutant; and setting functional tanks respectively for primary clarifying with bar screen and strainer, primary sedimentation by neutralization, aeration of supplying oxygen, aerobic biological process, anaerobic biological process, clarification, separation and filter. Its work flow is as follows:

(1) Primary clarify: Sewage is physically processed in the primary clarifier with bar screen and strainer, in order to remove impurities such as suspension, floating matter and fine fiber from the sewage.

(2) Adjusting PH value: The sewage is sampled and detected in the primary sedimentation tank by neutralization, then added a suitable preparation to neutralize to make PH value be between 6-9, and sufficiently mixed by setting aeration equipment.

(3) Supplying oxygen to the aeration tank: Sufficiently Supplying oxygen to the aeration tank, and sampling to determinate the intrinsic characteristics of the sewage. According to the intrinsic characteristics the suitable sewage treatment agent of LTC-A is selected.

(4) Aerobic biological process: Sufficiently supplying oxygen to the aerobic biological process tank, and placing the suitable sewage treatment agent of LTC-A which is specially raised and has strong adsorption, strong decomposition and oxidization to organic matter, and good subsidence. Thus in the suitable environment and conditions, aerobic microorganism can make organic matter in the sewage as food, change organic matter in the sewage into microorganism, and oxidize and decompose organic matter in the sewage to inorganic matter.

(5) Anaerobic Biological Process: The sewage processed by aerobic biological process is introduced in the anaerobic sludge backflown tank, so that in the case of no dissociative oxygen anaerobic microorganism in the sewage decomposes organic matter to $CO_2$, $H_2O$, $NH_3$ or the like and surplus sludge. The surplus sludge is backflown to the aerobic biological process tank or the aeration tank by backflow device, and then mixed with "activated sludge" such as sewage agent to participate retreatment.

(6) Separating by clarifying and filter: Suspension in the relatively pure water processed by anaerobic biological process, whose density is near to 1, is adsorbed by activated carbon and separated by clarifying in the sludge and clarified water separation tank. Then pure water is sent out, and filtered residue is backflown to the primary clarifier to be reprocessed.

Furthermy, the said sewage treatment agent of LTC-A can be directly placed in the aerobic biological process tank.

It is also disclosed in the present invention that the device of deep sewage treatment without sludge discharge with the method of deep sewage treatment without sludge discharge according to the present invention. The device mainly includes functional tanks and power, pump and control mechanism, in which: functional tanks comprise primary clarifier with bar screen, primary sedimentation tank by neutralization, aeration tank, aerobic biological process tank, anaerobic biological process tank, anaerobic and sludge backflow tank, sludge and clarified water separation tank, separation tank and release tank. Power, pump and control mechanism comprises blaster of supplying oxygen, electrically water pump, and control valve.

Backflow device on whose pipe there is a control valve is provided among anaerobic and sludge backflow tank, sludge and clarified water separation tank, separation tank, release tank, and aerobic biological process tank or aeration tank, so that the sludge and sewage therein can be backflown to aerobic biological process tank or the aeration tank by backflow device. The said primary clarifier with bar screen is provided with bar screen and strainer. The said primary sedimentation tank by neutralization and the said primary clarifier with bar screen are connected by a water pump with control valve. Electrical water pump is provided between the said primary sedimentation tank by neutralization and the aeration tank, so that the sewage to be treated in the primary sedimentation tank by neutralization is pumped to the aeration tank. Pipes connected with each other are provided between the said aeration tank and the aerobic biological process tank, so that the sewage in the aeration tank is unaffectedly flown into the aerobic biological process tank. Electrically water pump is provided on the pipe between the said aerobic biological process tank and the first anaerobic and sludge backflow tank. We can set many said anaerobic and sludge backflow tanks according to our need, which are adjacent and connected with each other, in every whose center an overflow weir is provided and the above side of the overflow weir is zigzag-shaped, nearly in every whose bottom is provided backflow device, on whose pipe a control valve is provided and which connects aerobic biological process tank and the aeration tank respectively. In the center of the said sludge and clarified water separation tank a pipe which introduces sludge is provided, and in the bottom of the said sludge and clarified water separation tank backflow device is provided. We can set many said separation tanks and release tanks according to our need, which are adjacent and connected with each other, in every whose bottom is provided with sludge backflow device, on whose pipe control valve is provided and which connects with aerobic biological process tank. A water pipe with a control valve is provided on the discharge outlet of the said release tank. In addition, the said functional tanks can be laminatedly overlapped to reduce the area. Because the dimension of the said the primary clarifier with bar screen, the primary sedimentation tank by neutralization, the aeration tank, and the aerobic biological process tank need be larger, they can be set downstream in the mode of excavating to satisfy the requirement of the dimension. The said anaerobic and sludge backflow tank, sludge and clarified water separation tank, separation tank and release tank can be set upstream according to our need, and the sludge and clarified water separation tank can be relatively larger.

In operation, before coming into the primary sedimentation tank by neutralization, the sewage is filtered by bar screen and strainer, to intercept the suspension of pollutant, and to protect the devices such as water pump unit used in the following process. The sewage coming into the primary sedimentation tank by neutralization is sampled, detected, added a suitable preparation to neutralize to make PH value be between 6-9. The sewage coming into the aeration tank is sampled, detected, added a suitable sewage treatment agent of LTC-A developed by Shanghai LianTan Chemical Ltd according to the detected result, which is pumped into the aerobic biological process tank together with the sewage in the aeration tank. The blaster unit supplies oxygen to the sewage in the primary sedimentation tank by neutralization, the aeration tank, and aerobic biological process tank respectively, so that fully with the various aerobic microorganism in the sewage the colloid-shaped and dissoluted organic matter in the sewage is oxidized and decomposed to microorganism, $CO_2$ and $H_2O$ in the condition of full oxygen to primarily pure the sewage. The primarily pured water processed by aerobic treatment is pumped to the first anaerobic and sludge backflow tank by the power device to be anaerobic processed, so that in the case of no dissociative oxygen anaerobic microorganism in the sewage makes hydrolysis and fermentation to the organic matter, and exchanges carbohydrate, protein and fat into monosaccharide, amino acid, fatty acid $CO_2$ and $H_2O$, then degenerates to methane. The relatively pure water and non-water-soluble sludge are achieved. The non-water-soluble sludge is precipitated under the tank, and is backflown to aerobic biological process tank or the aeration tank by non-periodically opening the correspond valve to be reprocessed. The relatively pure water flows through the zigzag-shaped overflow weir and interconnecting outlet, comes into the second anaerobic and sludge backflow tank to be anaerobic processed, and in the same way the sludge is backflown and the relatively pure water is overflown to the next anaerobic and sludge backflow tank. The pure water overflown in the last anaerobic and sludge backflow tank comes into separator by clarifying and filter. Though organic pollutant, nitrogen, and phosphorus or the like in the sewage have been processed by aerobic biological process and anaerobic biological process, in the water there is still solid matter, whose relative density approaches to 1, which suspends in the water and can not generally be removed with common methods of precipitation, which effects water chromaticity. Therefore, a larger sludge and clarified water separation tank is configured in this device to separate sludge and clarified water by controlling the flow rate of water and the adsorptive capacity of activated carbon. Finally the sludge is filtered and discharged, or returned to use again. The method of deep sewage treatment without sludge discharge based on the above idea and device thereof achieve very remarkable effect of sewage treatment, because of selecting a suitable sewage treatment agent of LTC-A scientifically depending on the intrinsic characteristics of processed sewage, comprehensively adopting physical, chemical and biological treatment methods, and reasonably setting operative treatment devices. Regarding the standards of biological oxygen demand (BOD), chemical oxygen demand (COD), ammonia and nitrogen, and petroleum or the like, which are difficult to attain desirable standard in the current sewage treatment, the actually measured value with the method and device of the present invention is lower than 70 mg/L while the nationally permitted density of COD is 100 mg/L, the actually measured value with the method and device of the present invention is lower than 15 mg/L while the nationally permitted density of BOD is 30 mg/L, the actually measured value with the method and device of the present invention is lower than 10 mg/L while the nationally permitted density of ammonia and nitrogen is 15 mg/L, the actually measured value with the method and device of the present invention is lower than 5 mg/L while the nationally permitted density of petroleum or the like is 10 mg/L. Therefore, all the standards are remarkably lower than the nationally permitted discharge standards, and all the standards simultaneously attain desirable standards, which is difficult to achieve in the other treatment methods of prior art. Because by adopting the technology of internal sludge backflow treatment the internal sludge makes full use of the aerobic environment and the anaerobic environment and is not discharged as pollutant, during all the period of sewage treatment no sludge is discharged, which cannot achieve in the current sewage treatment devices. The configuration of this sewage treatment device is scientific and reasonable: the functional tanks are laminatedly overlapped and adjacent to each other, which is advantageous to reduce the area and save resources and energy by valve control to perform backflow recycle without power device. Because the configuration of the device is simple, the less additional devices are required and the cost of primary investment and current maintenance is very low. Because in operation only one blaster and two electrically water pump work, consuming energy is very little. Because the special sewage treatment agent of LTC-A which is added according to the detected result of water sample only need be added once a half month, the cost of management and operation is very low, which is less than a half of the cost of other treatment methods of prior art. Therefore, the deep sewage treatment method without sludge discharge of the present invention is feasible and reliable, the deep sewage treatment device without sludge discharge of the present invention is scientific and reasonable, and the present invention has obvious technical sophistication, applicability and good market application prospect.

Figure 1:
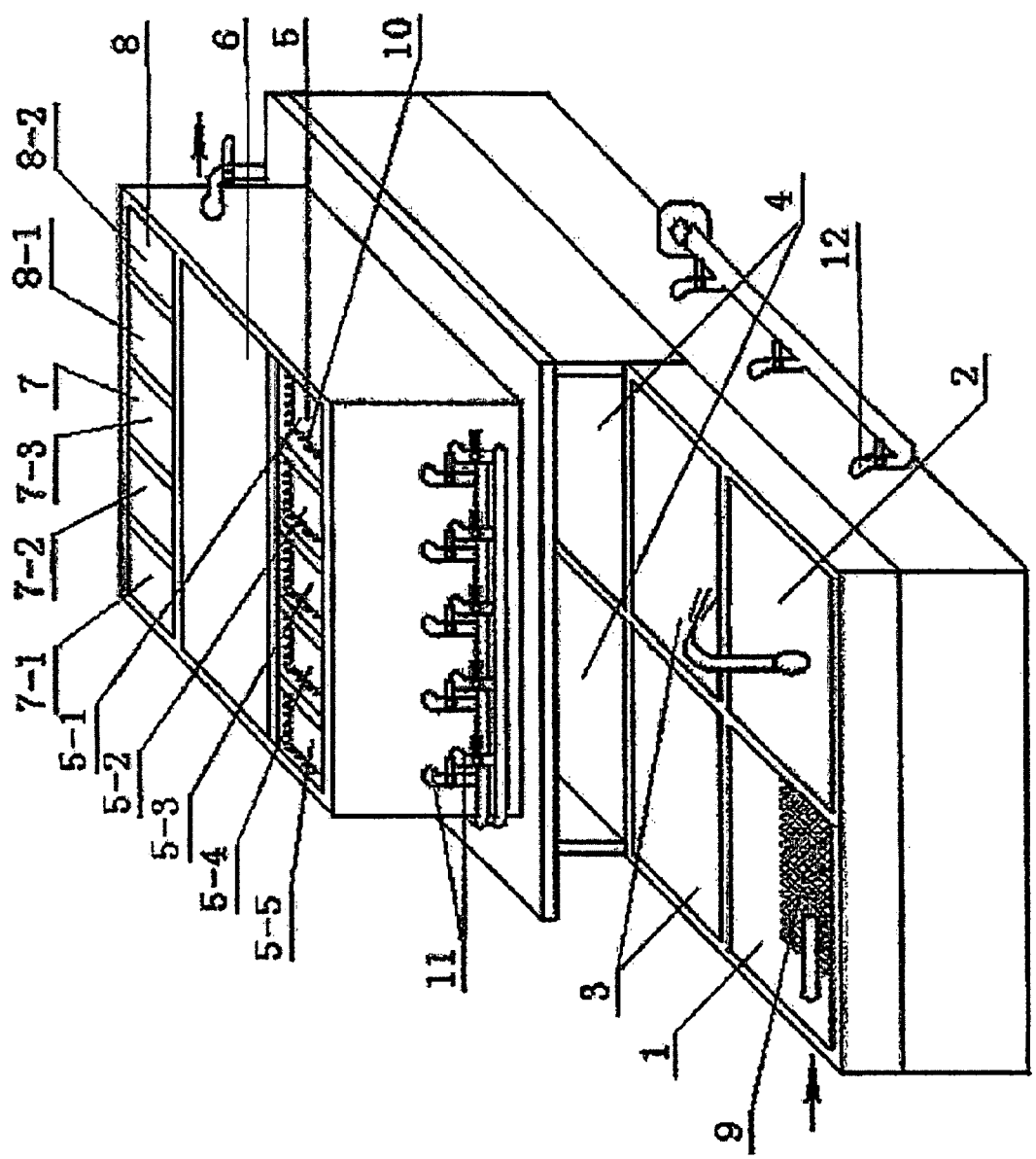
FIG. 1 is a perspective view showing a device in accordance with an embodiment of the present invention.

In the figures:
1. primary clarifier with bar screen
2. primary sedimentation tank by neutralization
3. aeration tank
4. aerobic biological process tank
5. anaerobic and sludge backflow tank
6. sludge and clarified water separation tank
7. separation tank
8. release tank
9. bar screen and strainer
10. overflow weir
11. sludge backflow opening
12. air inlet of supplying oxygen

DETAILED DESCRIPTION OF THE PREFERRED EMBODIMENTS

Hereinafter, the present invention will be described with reference to the accompanying drawings and an embodiment.

Referring to FIG. 1, the device of deep sewage treatment without sludge discharge according to the present invention mainly includes functional tanks and power, pump and control mechanism, in which: functional tanks are arranged in the updown laminating form and comprise primary clarifier 1 with bar screen, primary sedimentation tank by neutralization 2, aeration tank 3, and aerobic biological process tank 4, which locate downstream, and anaerobic and sludge backflow tank 5, sludge and clarified water separation tank 6, separation tank 7, and release tank 8, which locate upstream. Power, pump and control mechanism comprises blaster of supplying oxygen, electrically water pump, and control valve. The said primary clarifier 1 is provided with bar screen and strainer 9. The said primary sedimentation tank by neutralization 2 and the said primary clarifier 1 with bar screen are connected by a water pump with control valve. Electrically water pump is provided between the said primary sedimentation tank by neutralization 2 and the aeration tank 3. Water pipes with control valves are provided between the said aeration tank 3 and the aerobic biological process tank 4. Electrically water pump is provided on the pipe between the said aerobic biological process tank 4 and the first anaerobic and sludge backflow tank 5-1. The number of said anaerobic and sludge backflow tanks is five: 5-1, 5-2, 5-3, 5-4, 5-5, which are adjacent and connected with each other, in every whose center an overflow weir 10 is provided and the above side of the overflow weir is zigzag-shaped, nearly in every whose bottom is provided sludge backflow opening 11, which connects aerobic biological process tank 4 and aeration tank 3 respectively by a pipe with control valve. In the center of the said sludge and clarified water separation tank 6 a pipe which introduces sludge is provided, and in the bottom of the said sludge and clarified water separation tank 6 backflow device is provided. The number of the said separation tanks 7 is three: 7-1, 7-2, 7-3, which are adjacent and connected with each other. The number of release tanks 8 is two: 8-1, 8-2, which are adjacent and connected with each other. Release tank 8-1 and separation tank 7-3 are adjacent and connected with each other, in both of whose bottoms are provided sludge backflow openings 11, which connect with aerobic biological process tank 4 respectively by water pipes with control valves. A control valve is provided on the discharge outlet of pure water of the said release tank 8. The said primary sedimentation tank by neutralization 2, the aeration tank 3, and the aerobic biological process tank 4 are provided air inlet of supplying oxygen 12 on their side walls.

Figure 2:
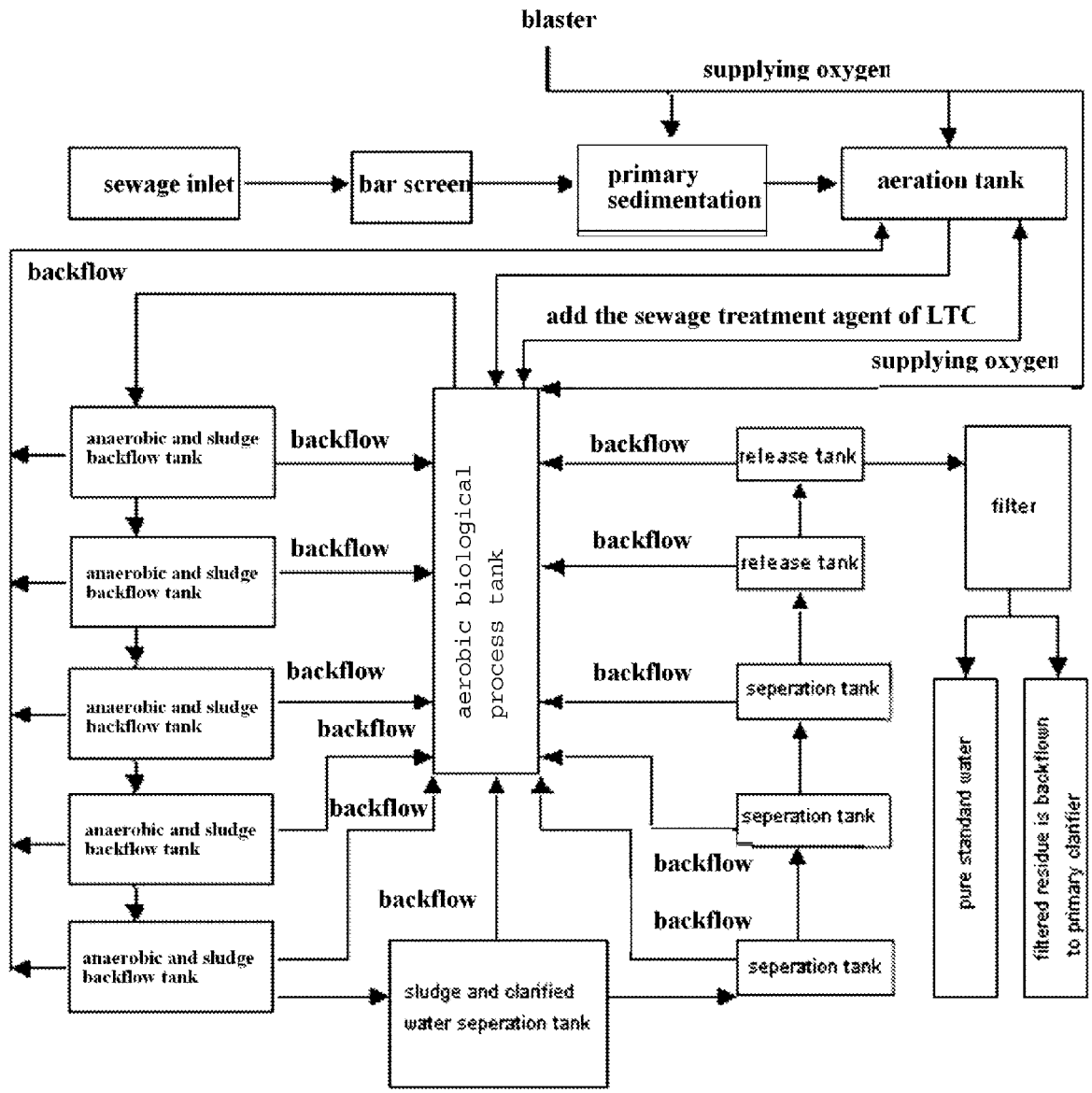
FIG. 2 is a flow chart showing a method of the present invention.

In FIG. 2, the method of deep sewage treatment without sludge discharge according to the present invention is as follows: comprehensively adopting physical, chemical and biological sewage treatment methods; selecting sewage treatment agent of LTC-A developed by Shanghai LianTan Chemical Ltd according to the amount of sewage discharge and the intrinsic characteristics of sewage pollutant; setting primary clarifier 1 with bar screen and strainer, primary sedimentation tank by neutralization 2 for adjusting and controlling PH value, device of supplying oxygen mainly including blaster, aerobic biological process tank 4 for creating working environment to aerobic microorganism, anaerobic and sludge backflow tank 5 for creating working environment to anaerobic microorganism, sludge and clarified water separation tank 6 for separating sludge and relatively pure water, separation tank 7, and release tank 8. Its work flow is as follows:

(1) Primary clarify: Sewage is physically processed in the primary clarifier 1 with bar screen and strainer, in order to remove impurities such as suspension, floating matter and fine fiber from the sewage by clarifying and precipitating.

(2) Adjusting PH value: The sewage is sampled and detected in the primary sedimentation tank by neutralization 2. If PH value is more than 9, the medicament including acid is added; if PH value is less than 6, the medicament including alkali is added. The sewage is neutralized to make PH value be between 6-9. Particularly, the medicament is added while detecting, so that PH value is controlled to be between 6-9. The above said medicament including acid and medicament including alkali are medicament including acid and medicament including alkali generally used in current sewage neutralization. And it is sufficiently mixed by setting aeration equipment.

(3) Supplying oxygen to aeration tank: Supply oxygen sufficiently to aeration tank 3, and maintain 0.012 cubic/min·m$^2$. Sampling to determinate the intrinsic characteristics of the sewage. According to the intrinsic characteristics the suitable sewage treatment agent of LTC-A is selected and placed. The intrinsic characteristics need to be detected is PH value, chemical oxygen demand, biological oxygen demand, ammonia and nitrogen or the like. And according to these the suitable sewage treatment agent of LTC-A is selected and placed. The treatment agent is selected according to the following table.

| chemical oxygen demand COD | sewage treatment agent of LTC-A |
| --- | --- |
| <200 | LTC-A1 |
| 200-1000 | LTC-A2 |
| >1000 | LTC-A3 |

(4) Aerobic biological process: Sufficiently supplying oxygen to aerobic biological process tank 4, and the oxygen amount must be more than 0.012 cubic/min·m$^2$. Thus in the suitable environment and the conditions (i.e., 10-40° C., and sufficient oxygen), Aerobic microorganism in the suitable sewage treatment agent of LTC-A which is specially raised and has strong adsorption, strong decomposition and oxidization to organic matter and good subsidence, can make organic matter in the sewage as food, change organic matter in the sewage into microorganism, and oxidize and decompose organic matter in the sewage to inorganic matter.

(5) Anaerobic biological process: The primarily pured water processed by aerobic biological process is introduced in the anaerobic and sludge backflow tank 5, so that in the case of no dissociative oxygen anaerobic microorganism in the primarily pured water decomposes organic matter. Anaerobic bacteria absorb organic matter in the sewage by activated sludge in the anaerobic condition (i.e., Temperature is 10-40° C. and oxygen is sufficient). Anaerobic bacteria make organic matter as food and change organic matter in the sewage into $CO_2$, $H_2O$, $NH_3$ or the like and surplus sludge. The surplus sludge is backflown to aerobic biological process tank 4 or aeration tank 3 by backflow device, and then mixed with "activated sludge" such as the selected sewage treatment agent of LTC-A to participate retreatment.

(6) Separating by clarifying and filter: Suspension in the relatively pure water processed by anaerobic biological process, whose density is 0.95-1.05, is adsorbed by activated carbon and separated by clarifying in sludge and clarified water separation tank 6. Then completely standard water is sent out, and filtered residue is backflown to primary clarifier 1 to be reprocessed.

The invention claimed is:

1. A device for deep sewage treatment without sludge discharge comprising:
    functional tanks;
    multiple electric pumps; and
    multiple control valves for controlling the flow of a sewage stream and a water stream;
    the functional tanks further comprising:
    a primary clarifier (1) having a bar screen and a strainer (9);
    a primary sedimentation tank for neutralization (2), wherein the primary sedimentation tank for neutralization (2) and the said primary clarifier (1) are fluidly connected;
    an aeration tank (3), wherein the primary sedimentation tank for neutralization (2) and the aeration tank (3) are fluidly connected;
    an aerobic biological process tank (4), wherein the aeration tank (3) and the aerobic biological process tank (4) are fluidly connected;
    multiple anaerobic and sludge backflow tanks (5);
    the anaerobic and sludge backflow tanks (5) being fluidly connected to the aerobic biological process tank (4) and the aeration tank (3) respectively, wherein the fluid connection provides for sludge flow from the anaerobic and sludge backflow tanks (5) into the aerobic biological process tank (4) and the aeration tank (3) respectively;
    a sludge and clarified water separation tank (6) being fluidly connected the anaerobic and sludge backflow tanks (5), wherein the fluid connection provides for sludge stream flow back to the anaerobic and sludge backflow tanks (5);
    multiple separation tanks (7) being fluidly connected to the aerobic biological process tank (4) and the aeration tank (3) respectively wherein the fluid connection provides for sludge stream flow from multiple separation tanks (7) to the aerobic biological process tank (4) and the aeration tank (3) respectively; and
    multiple release tanks (8), being fluidly connected with the multiple separation tanks (7) and the aerobic biological process tank (4);
    the multiple release tanks (8) further being fluidly connected, to a discharge outlet, wherein the discharge outlet is for a treated and purified water stream; and
    a blaster for supplying oxygen, wherein each of the primary sedimentation tank for neutralization (2), the aeration tank (3), and the aerobic biological process tank (4) are provided with an air inlet (12) for the supply of oxygen.

2. The device for deep sewage treatment without sludge discharge of claim 1, further comprising:
    a primary sedimentation tank for neutralization (2), wherein the primary sedimentation tank for neutralization (2) and the said primary clarifier (1) are fluidly connected by a first pipe having a first control valve;
    an aeration tank (3), wherein a first electric water pump is provided between the primary sedimentation tank for neutralization (2) and the aeration tank (3);

an aerobic biological process tank (4), wherein second pipes with second control valves are provided between the aeration tank (3) and the aerobic biological process tank (4);

multiple anaerobic and sludge backflow tanks (5);

the anaerobic and sludge backflow tanks (5) being adjacent to each other and each having an overflow weir (10) with a zigzag-shaped top;

the anaerobic and sludge backflow tanks (5) each further having a first sludge backflow opening (11) on a bottom side of the tanks (5), wherein third pipes, having third control valves, fluidly connect to the aerobic biological process tank (4) and the aeration tank (3) respectively;

a second electric water pump is provided between the aerobic biological process tank (4) and a first anaerobic and sludge backflow tank (5-1);

a sludge and clarified water separation tank (6) having a fourth pipe therein which introduces the sludge stream, therein and having a fifth pipe in a bottom side of the sludge and clarified water separation tank (6) to allow backflow of the sludge stream;

multiple separation tanks (7) mounted adjacent to each other and fluidly connected with each other;

the multiple separation tanks (7) each having a second sludge backflow opening (11) in a bottom side of the tank, wherein the second sludge backflow opening (11) is fluidly connected to the aerobic biological process tank (4) and the aeration tank (3) respectively; and multiple release tanks (8), the release tanks (8) are mounted adjacent to each other and are fluidly connected with each other, wherein a first release tank (8-1) and a first separation tank (7-3) are adjacent and fluidly connected with each other, and wherein a bottom of the first release tank (8-1) and a bottom of the first separation tank (7-3) are provided with a third sludge backflow opening (11), and wherein the third sludge backflow opening is fluidly connected with the aerobic biological process tank (4); and the multiple release tanks (8) further comprising a sixth pipe, having a sixth control valve, fluidly connected between a discharge outlet and the release tanks (8).

3. The device for deep sewage treatment without sludge discharge of claim 1, wherein the functional tanks are arranged so as to form an integrated sewage treatment unit, and wherein the integrated sewage treatment unit comprises the primary clarifier (1) with bar screen, the primary sedimentation tank for neutralization (2), the aeration tank (3), and the aerobic biological process tank (4), which form a downstream section, and wherein the anaerobic and sludge backflow tank (5), the sludge and clarified water separation tank (6), the separation tank (7), and the release tank (8), form an upstream section.

* * * * *